US008985631B2

(12) United States Patent
Garceau

(10) Patent No.: US 8,985,631 B2
(45) Date of Patent: *Mar. 24, 2015

(54) TRAILER FRAME

(71) Applicant: Norco Industries, Inc., Compton, CA (US)

(72) Inventor: Bernard F. Garceau, Vandalia, MI (US)

(73) Assignee: Norco Industries, Inc., Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,189

(22) Filed: Jun. 4, 2013

(65) Prior Publication Data

US 2013/0300097 A1    Nov. 14, 2013

Related U.S. Application Data

(63) Continuation-in-part of application No. 13/294,685, filed on Nov. 11, 2011, now Pat. No. 8,491,010.

(51) Int. Cl.
| | |
|---|---|
| *B62D 21/20* | (2006.01) |
| *B62D 21/00* | (2006.01) |
| *B62D 63/06* | (2006.01) |
| *B62D 21/02* | (2006.01) |

(Continued)

(52) U.S. Cl.
CPC .............. *B62D 21/20* (2013.01); *B62D 63/061* (2013.01); *B62D 21/02* (2013.01); *B60G 3/145* (2013.01); *B60G 11/22* (2013.01); *B60G 2202/144* (2013.01); *B60G 2204/125* (2013.01); *B60G 2300/04* (2013.01)
USPC ............................ 280/789; 280/781; 280/785

(58) Field of Classification Search
CPC ........ B62D 21/00; B62D 21/02; B62D 21/12; B62D 21/20
USPC .................................. 280/781, 785, 789, 800
See application file for complete search history.

(56) References Cited

U.S. PATENT DOCUMENTS

| | | | |
|---|---|---|---|
| 1,493,736 A | 5/1924 | Collins | |
| 3,540,756 A | 11/1970 | Brunk | |
| 3,856,344 A | 12/1974 | Loeber | |

(Continued)

FOREIGN PATENT DOCUMENTS

| | | |
|---|---|---|
| EP | 0479115 | 9/1991 |
| GB | 323537 | 1/1930 |

(Continued)

*Primary Examiner* — Paul N Dickson
*Assistant Examiner* — Barry Gooden, Jr.
(74) *Attorney, Agent, or Firm* — Shannon V. McCue; Hahn, Loeser & Parks, LLP

(57) ABSTRACT

A trailer frame including an axle section having two spaced longitudinal frame members connected by at least one cross member, the longitudinal frame members each having a first end and a second end; a rear section attachable to the axle section; and a dimple assemble joining the axle section to the rear section, the dimple assembly including a dimple pattern formed on each frame member of the axle assembly, the dimple pattern on the axle assembly defining a first dimple axis, and a dimple pattern formed on one end of the rear section and nestable within the dimple pattern formed on the axle section, the dimple pattern on the rear section defining a second dimple axis offset relative to the first dimple axis to create a camber between the axle section and the rear section when the first dimple is nested within the second dimple pattern.

17 Claims, 8 Drawing Sheets

(51) Int. Cl.
*B60G 3/14* (2006.01)
*B60G 11/22* (2006.01)

(56) References Cited

U.S. PATENT DOCUMENTS

| | | | |
|---|---|---|---|
| 3,891,231 A | 6/1975 | Snoberger et al. | |
| 4,753,450 A | 6/1988 | Wibben | |
| 4,929,018 A | 5/1990 | Carty | |
| 4,966,386 A | 10/1990 | Werdich | |
| 5,028,072 A | 7/1991 | Lindsay et al. | |
| 5,326,128 A | 7/1994 | Cromley, Jr. | |
| 5,378,006 A | 1/1995 | Stuart | |
| 5,380,028 A | 1/1995 | Ferris et al. | |
| 5,599,038 A | 2/1997 | German | |
| 5,725,247 A | 3/1998 | Nilsson et al. | |
| 5,836,606 A | 11/1998 | Spoto et al. | |
| 6,004,652 A | 12/1999 | Clark et al. | |
| 6,092,819 A | 7/2000 | Overby et al. | |
| 6,189,930 B1 | 2/2001 | Kalazny | |
| 6,286,868 B1 | 9/2001 | von Mayenburg | |
| 6,299,210 B1 | 10/2001 | Ruehl et al. | |
| 6,398,261 B1 | 6/2002 | Ammer et al. | |
| 6,485,054 B1 | 11/2002 | Yurgevich | |
| 6,494,285 B1 | 12/2002 | Williams | |
| 6,585,285 B2 | 7/2003 | Koch | |
| 6,629,720 B1 | 10/2003 | Evans | |
| 6,652,020 B2* | 11/2003 | Few | 296/204 |
| 6,692,014 B1 | 2/2004 | Grosso et al. | |
| 6,708,988 B2 | 3/2004 | Dunlap et al. | |
| 6,729,100 B2 | 5/2004 | Koski et al. | |
| 6,854,793 B2* | 2/2005 | Few | 296/204 |
| 6,932,388 B2* | 8/2005 | Few et al. | 280/787 |
| 6,939,599 B2 | 9/2005 | Clark | |
| 7,111,854 B1* | 9/2006 | Tuthill et al. | 280/86.75 |
| 7,121,586 B2 | 10/2006 | McNally | |
| 7,441,809 B1* | 10/2008 | Coombs et al. | 280/785 |
| 7,703,258 B2 | 4/2010 | LaLonde et al. | |
| 7,717,464 B2 | 5/2010 | Leeve et al. | |
| 7,717,498 B2* | 5/2010 | Fleming | 296/203.01 |
| 7,770,928 B2 | 8/2010 | Booher | |
| 7,793,981 B2 | 9/2010 | Xie et al. | |
| 7,837,215 B2 | 11/2010 | Hopper | |
| 8,205,402 B1 | 6/2012 | diGirolamo et al. | |
| 8,322,750 B2 | 12/2012 | Crow et al. | |
| 8,485,555 B2* | 7/2013 | Hunt | 280/781 |
| 8,491,010 B2* | 7/2013 | Garceau | 280/789 |
| 2002/0063422 A1 | 5/2002 | Few et al. | 280/789 |
| 2003/0160427 A1* | 8/2003 | Garceau et al. | 280/414.1 |
| 2003/0189359 A1* | 10/2003 | Few | 296/204 |
| 2004/0036267 A1 | 2/2004 | Evans | |
| 2004/0075301 A1* | 4/2004 | Few | 296/204 |
| 2005/0275208 A1* | 12/2005 | Few et al. | 280/788 |
| 2007/0013171 A1* | 1/2007 | Tuthill et al. | 280/684 |
| 2007/0194564 A1 | 8/2007 | Garceau et al. | |
| 2011/0163527 A1* | 7/2011 | Hunt | 280/785 |

FOREIGN PATENT DOCUMENTS

| | | |
|---|---|---|
| GB | 1552443 | 9/1979 |
| GB | 1562883 | 3/1980 |
| GB | 2044193 | 10/1980 |

* cited by examiner

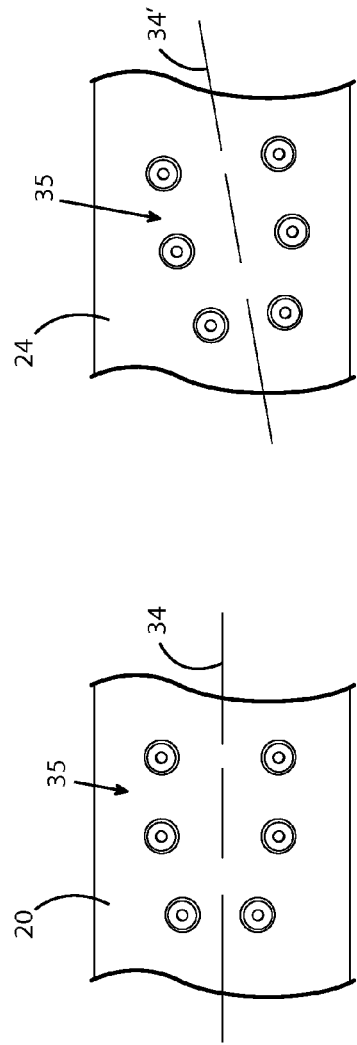
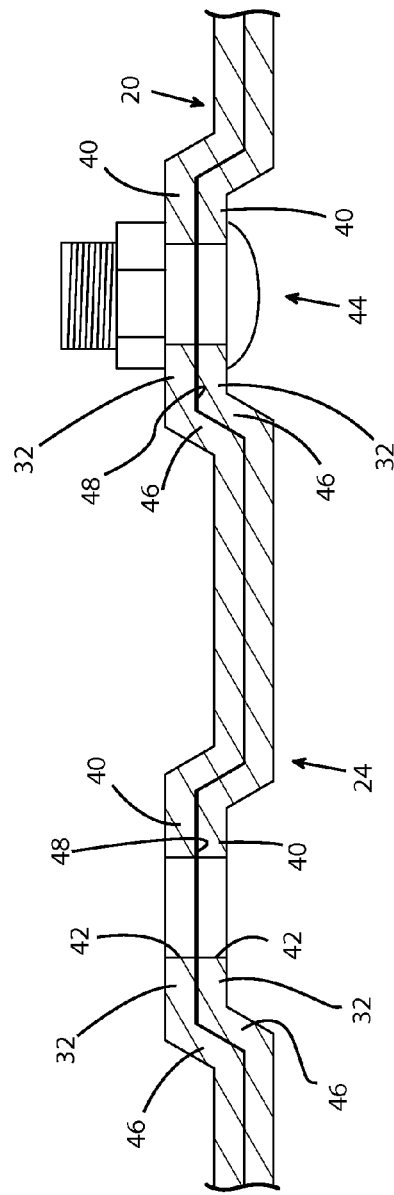

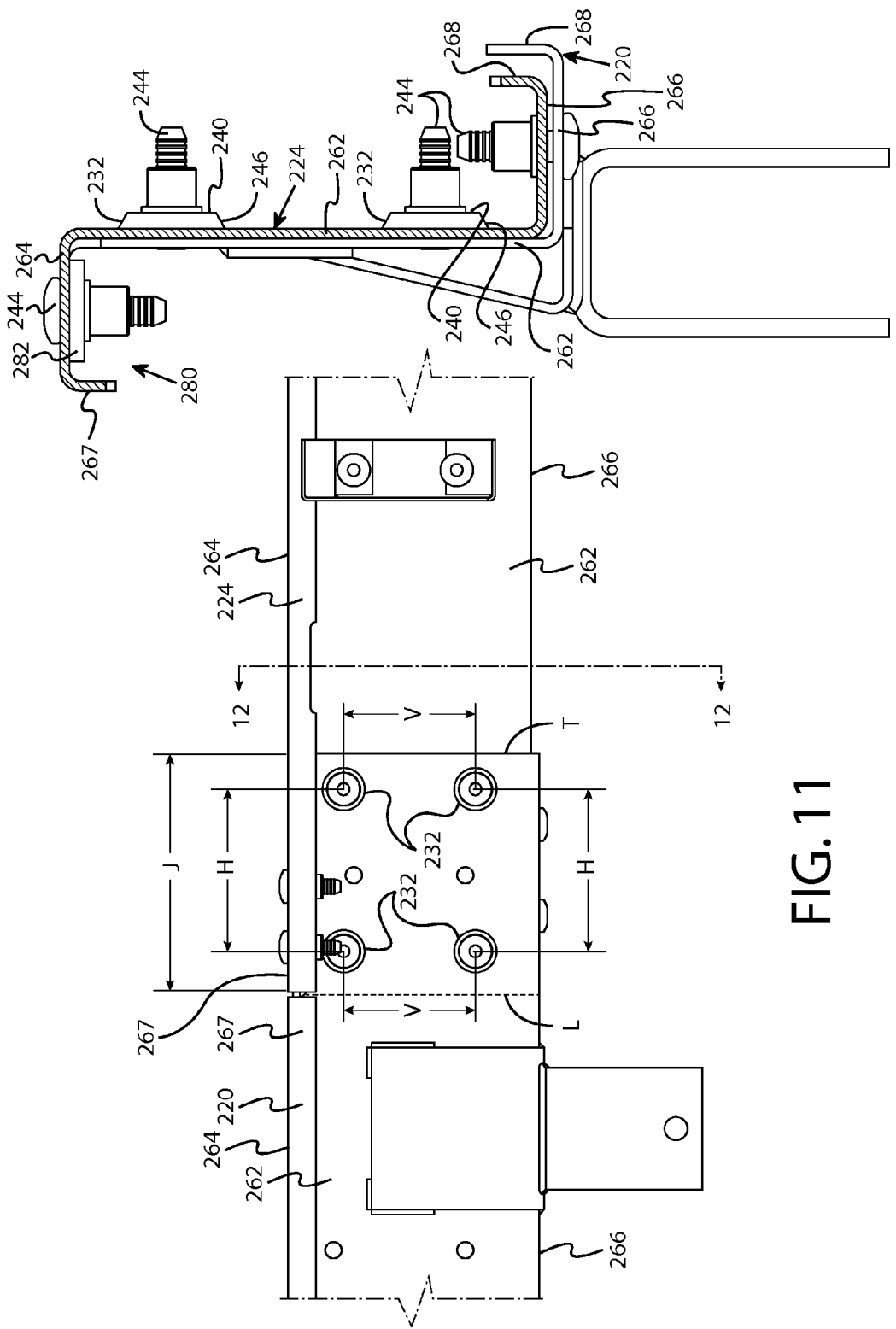

TRAILER FRAME

CONTINUING APPLICATION DATA

This application is a continuation-in-part of co-pending U.S. application Ser. No. 13/294,685 filed Nov. 11, 2011 which is hereby incorporated by reference.

TECHNICAL FIELD

The present invention generally relates to trailer frames, and more particularly to bolt-together trailer frames. More particularly, the present invention relates to a trailer frame having an enhanced axle section. Most particularly, the present invention relates to a trailer frame where the camber between an axle section and an adjacent section is set by a dimple pattern.

BACKGROUND OF THE INVENTION

Typically trailer frames are manufactured by welding frame members together. Typical frame members include I-beam, flat, L-shape, U-shape or tubular rail sections. The frames generally have a ladder construction with axle units connected to the side frame members of the ladder near the center or rearward portion of the frame. These trailer frames are used for boat trailers, car trailers, recreational vehicles, horse trailers, utility trailers, and the like.

Since the entire frame, including the axle is pre-assembled, shipping may be difficult with only a few assembled frames being shipped at any time. In most cases, frames are built on a made to order basis to avoid maintaining pre-assembled frames in inventory.

It is desirable to have camber within the frame typically at the rearward end of the frame to accommodate loads placed on the frame. When loaded, the frame will deform. To level the load on the frame, existing manufacturers heat the frame to cause it to deform and create camber. Existing frames are ladder frames having a pair of I-beams that extend the length of the frame. To create positive camber at the rear of such a frame, for example, a weld is placed along the top side of the frame members between the axles and the rear end of the frame to draw the rear end up. Once positive camber is created, water is thrown onto the weld to rapidly cool it and lock the camber in place. Since relying on the heat of the weld to create camber is imprecise, additional welding may be used to adjust the camber to a suitable amount. This method of creating camber alters the material properties of the metal at the weld and may make the frame more susceptible to failure. Alternatively, the frame members may be pounded or otherwise mechanically deformed to achieve the desired camber. It will be appreciated that the variables involved in either method prevent any consistency in the amount of camber achieved for each trailer frame.

SUMMARY OF THE INVENTION

The present invention generally provides trailer frame including an axle section having two spaced longitudinal frame members connected by at least one cross member, the longitudinal frame members each having a first end and a second end; a rear section attachable to the axle section; and a dimple assemble joining the axle section to the rear section, the dimple assembly including a dimple pattern formed on each frame member of the axle assembly, the dimple pattern on the axle assembly defining a first dimple axis, and a dimple pattern formed on one end of the rear section and nestable within the dimple pattern formed on the axle section, the dimple pattern on the rear section defining a second dimple axis offset relative to the first dimple axis to create a camber between the axle section and the rear section when the first dimple is nested within the second dimple pattern.

The present invention further provides a trailer frame having an enhanced axle section is provided. The axle section has a pair of boxed frame rails. Each frame rail includes a first frame half and a second frame half that are joined together to define a central cavity. At least one cross member extends between the pair of boxed frame rails to join them together.

The present invention further provides a trailer frame including an axle section having two longitudinal frame members on each side of the axle section that are connected by at least one cross member, the two longitudinal frame members each include a first end and a second end that each have a plurality of axle dimples, and the axle section having a means for securing at least one axle; a front section having a front cross member and two longitudinal frame members on each side of the front section, the two longitudinal frame members each include a first end fixedly secured to the front cross member and a second end having a plurality of front dimples in nested engagement with the plurality of axle dimples on the first end of the axle section; and a rear section having a rear cross member and two longitudinal frame members on each side of the rear section, the two longitudinal frame members each include a first end fixedly secured to the rear cross member and a second end having a plurality of rear dimples in nested engagement with the plurality of axle dimples on the second end of the axle section, wherein camber of the trailer frame is preset in at least one of the following: the plurality of dimples on the rear section and the plurality of dimples on the front section.

The present invention still further provides a torsion suspension assembly for a trailer frame including an elastomeric element, the elastomeric element defining a central bore and plural pin receiving bores located on a circle spaced radially outward from the central bore, a cylindrical journal received in the central bore in the elastomeric element, an outer end cap and an inner end cap, wherein the outer and inner end caps are adapted to enclose at least a portion of the elastomeric element, each end cap having at least one pin extending inward therefrom, wherein the pins from the outer and inner end caps are received in respective pin receiving bores, each pin extending an extent such that a portion of the pin on the outer end cap overlaps a portion of the pin on the inner end cap within the elastomeric element, each end cap defining an axle mount bore having a non-circular shape, and an axle mount having a non-circular cross section insertable through the axle mount bores in the end caps and rotatably received in the cylindrical journal.

BRIEF DESCRIPTION OF THE DRAWINGS

FIG. 3A is a schematic view showing an axle section having a dimple pattern defining a dimple axis and a rearward section having a dimple pattern offset relative to the dimple pattern on the axle section to define an offset dimple axis, where the offset has been exaggerated for purposes of illustration.

FIG. 4 is a sectioned top plan view showing further details of a joint in a trailer according to the invention.

FIG. 11 is a side elevational view of the joint between the adjacent sections shown in FIG. 10.

FIG. 12 is a section view as might be seen along line 12-12 in FIG. 11.

DETAILED DESCRIPTION OF THE INVENTION

Figure 1:
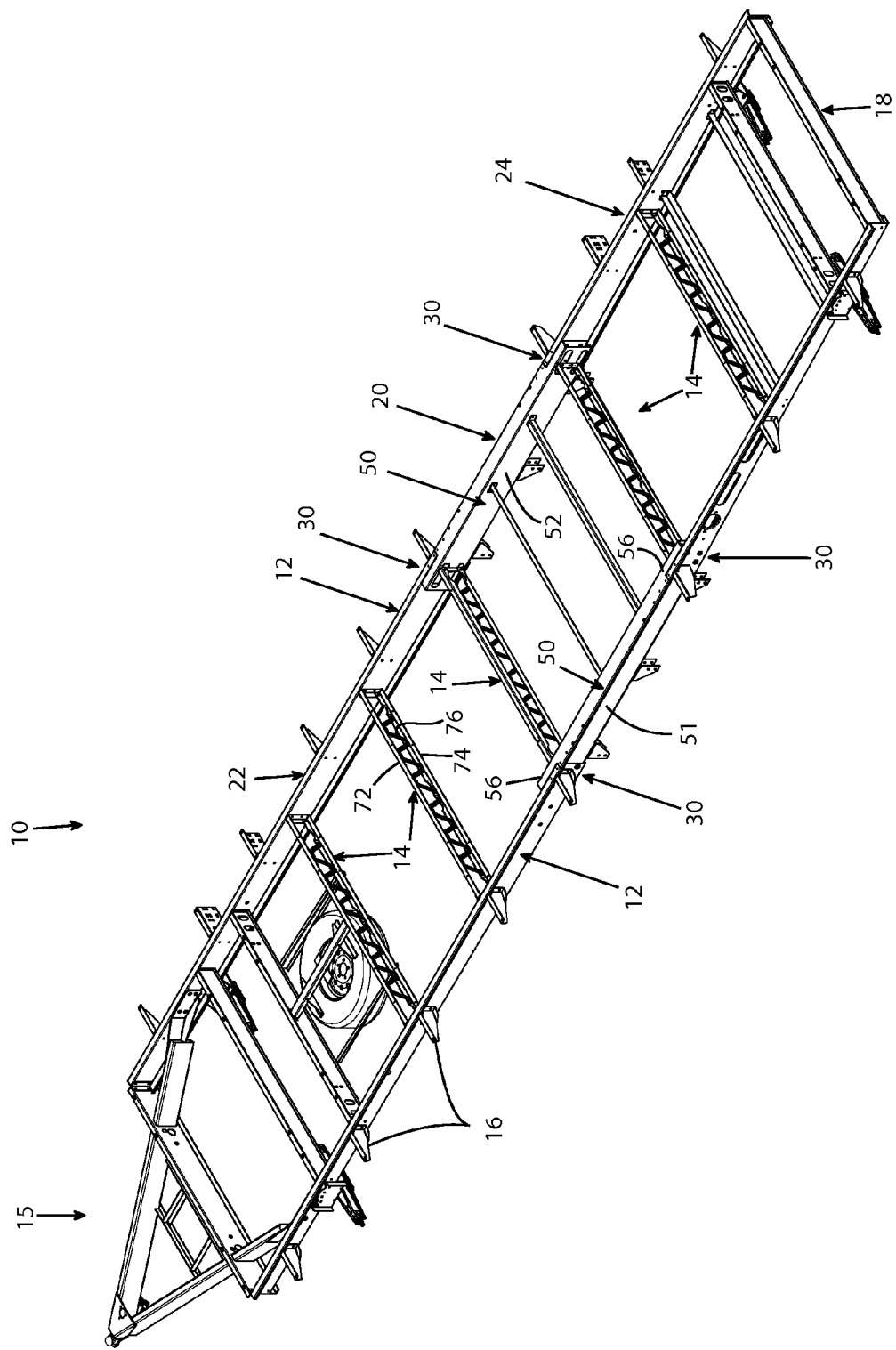
FIG. 1 is a top perspective view of a trailer according to the invention.

A trailer frame 10 according to the invention is depicted in the accompanying drawings. Trailer frame 10 is divided into plural sections. The sections are connected by a dimple assembly 30. The dimple assembly 30 may be used to set the camber between sections as described more completely below.

Trailer frame 10 may be assembled from plural rails or side frame members 12 and one or more cross members 14. A tongue assembly 15 may be attached to facilitate coupling of trailer frame 10 to a vehicle. The configuration of tongue assembly 15 may vary depending on the vehicle to which tongue assembly 15 is attached or the application for trailer frame 10. Likewise, floor supports our outriggers 16 may be attached to side frame members 12 as needed for a particular application. Trailer frame 10 may include a bumper assembly 18.

Figure 2:
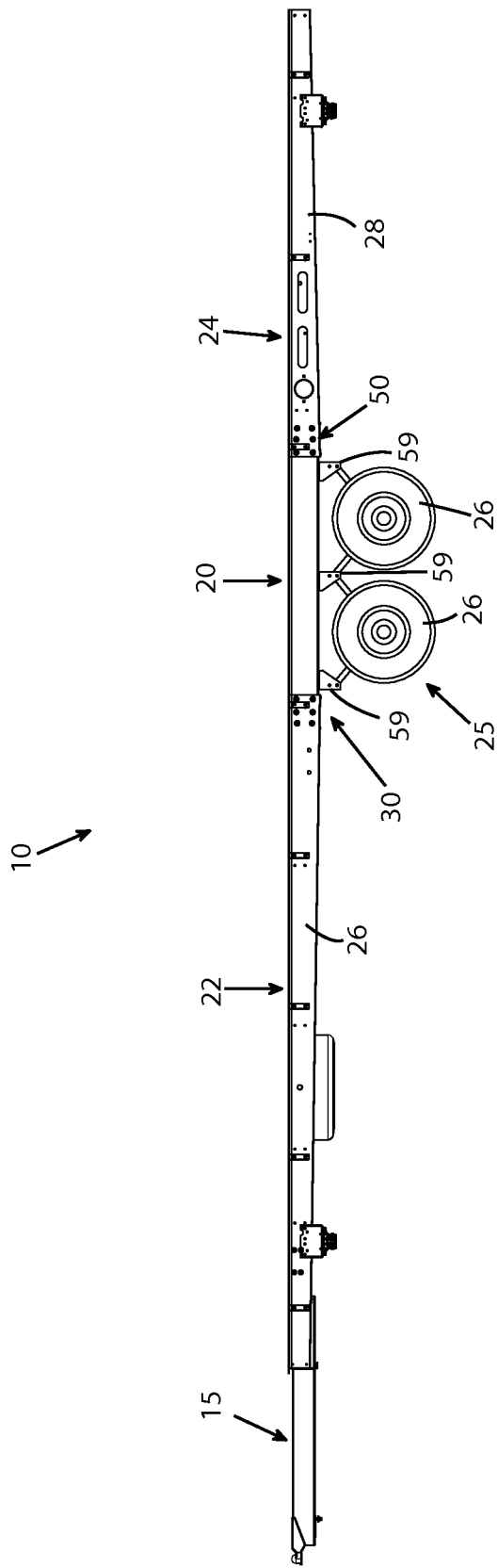
FIG. 2 is a side elevational view of a trailer according to the invention.

Trailer frame 10 includes multiple sections that are joined together. For example, trailer frame 10 may include an axle section 20, a forward section 22 and a rearward section 24. It will be appreciated that frame 10 may include fewer or more sections. In the example shown, axle section 20 is located between forward section 22 and rearward section 24. As shown in FIG. 2, axle section 20 includes an axle assembly 25, which may be a sprung unit or a torsion unit, having one or more axles with wheels 26 operatively supported thereon.

Figure 3:
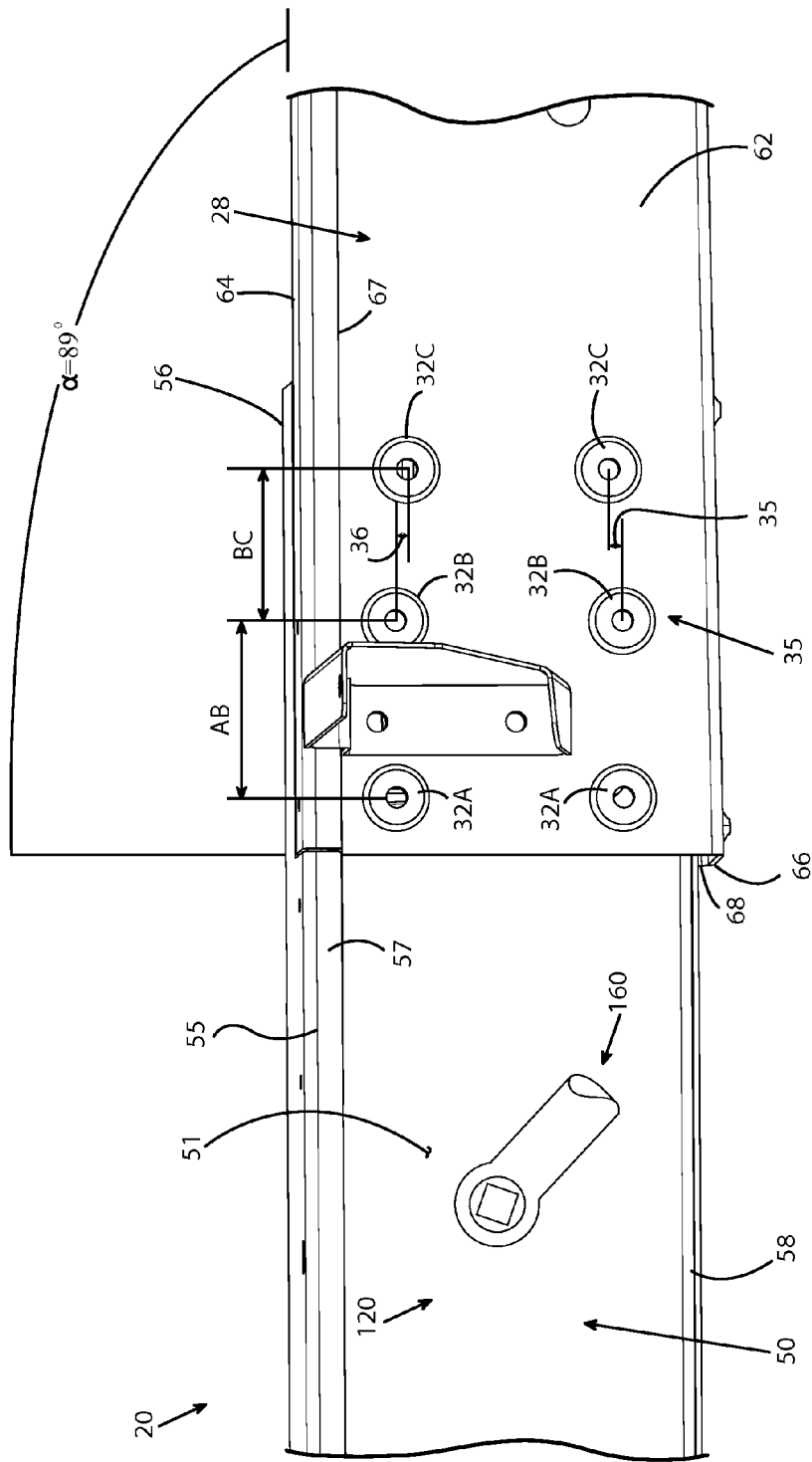
FIG. 3 is an enlarged side elevational view showing details of a joint in a trailer according to the invention.

Two sections are attached to each other by a dimple assembly 30. As best shown in FIGS. 3 and 4, dimple assembly 30 may include one or more dimples 32 formed on each frame member that nest within each other to connect frame members from each section. Dimples 32 may have any shape including, geometric shapes, oblong, or irregular shapes. The circular shape shown is just one example. One or more dimples may be used to define a dimple pattern, generally indicated at 35. The dimple pattern 35 defines a dimple axis 34 which generally represents a major direction of dimple pattern 35. Dimple pattern 35 may, thus, be used to control the orientation of sections relative to each other. For example, dimple pattern 35 on one frame member may be offset relative to the dimple pattern 35 on another frame member, such that when the frame members are joined by nesting one dimple pattern in the other, the frame members of respective sections are placed in a desired orientation. For example, dimple pattern 35 on one frame member may have a dimple axis arranged at an angle relative to a dimple pattern 35 on another frame member to create positive/negative camber between adjacent sections. According to another aspect of the invention, the spacing between dimples 32 may be varied in the vertical and horizontal directions to optimize the loading of dimples 32 as well.

Any number of dimples 32 may be used and in any configuration. The examples provided are, therefore, not limiting. Increasing the size or number of dimples increases the surface over which the load is spread, and therefore, larger or greater numbers of dimples 32 may be used to handle greater loads. Smaller or fewer dimples may be used for smaller loads. In the example shown, dimple pattern 35 includes three columns (A,B,C) of dimples 32. Columns A,B,C may include more than one row of dimples 32. For example, as shown, two rows of dimples 32 may be used. The dimples 32A, 32B in first and second rows are arranged parallel to each other. The third column C of dimples 32 may be offset relative to columns A,B. For example, dimples 32C in third column C may be located closer to the center of a side frame member at 36. Also, the spacing (BC) between dimples in columns B and C may be reduced in comparison to the spacing (AB) between columns A and B, as shown. In the example shown, the centers of the dimples in column C are located 0.25 inch inward relative to corresponding dimples 32 in column B. Also, the centers of dimples 32 in column C are spaced 0.5 inches closer to the centers of dimples 32 in column B when compared to the spacing between columns A and B. An exemplary spacing may be 3.5 inches between columns A and B and 3.0 inches between columns B and C. The rows of dimples 32 in columns A and B may be vertically spaced 2.5 inches on center, while the dimples 32 in column C are vertically spaced 2.0 inches on center. It will be appreciated that the spacing between individual dimples 32 in column C do not need to be uniform with each dimple 32 having a different offset depending on the application or desired loading to be achieved. In the depicted example, finite element analysis shows that placing the dimples in third column C closer to the center and nearer to the dimples 32B drives the load toward the top and bottom flanges minimizing deflection of the side wall of the frame members.

With reference to FIG. 4, dimples 32 may have an outwardly opening frusto-conical section. Dimple 32 may be stamped into the section such that a base 40 is located inward of the outer wall of the frame member. As shown, base 40 may be circular and define a central opening 42 that receives a fastener 44, such as a Huck® bolt or the like. A dimple wall 46 extends axially and radially outward from base 42. When assembled, the load transfer between dimples 32 occurs at walls 46 of each respective dimple 32. As best seen in FIG. 4, which shows two frame members fastened together at dimples 32, with the fastener 44 removed on the left to show greater detail of the dimples 32, a small gap 48 may lie between each base 42 of dimples 32.

As shown in FIGS. 1 and 2, dimples 32 may be formed on any surface to join frame members together. For example, a planar surface such as the upstanding sidewall of a frame member may be used. Dimple size may vary depending on the surface to which the dimple 32 is applied, the number of dimples used, and the amount of loading on the dimple 32. In the example shown, dimples 32 are located on an upstanding side wall of the axle section 20 and an adjacent forward section 22 and rearward section 24. Axle section 20 has dimple patterns 35 at each end that mate with dimples 32 on the forward and rear sections 22, 24. It will be appreciated that each section 20, 22, 24 of trailer frame 10 may have various lengths and cross-sections.

Figure 6:
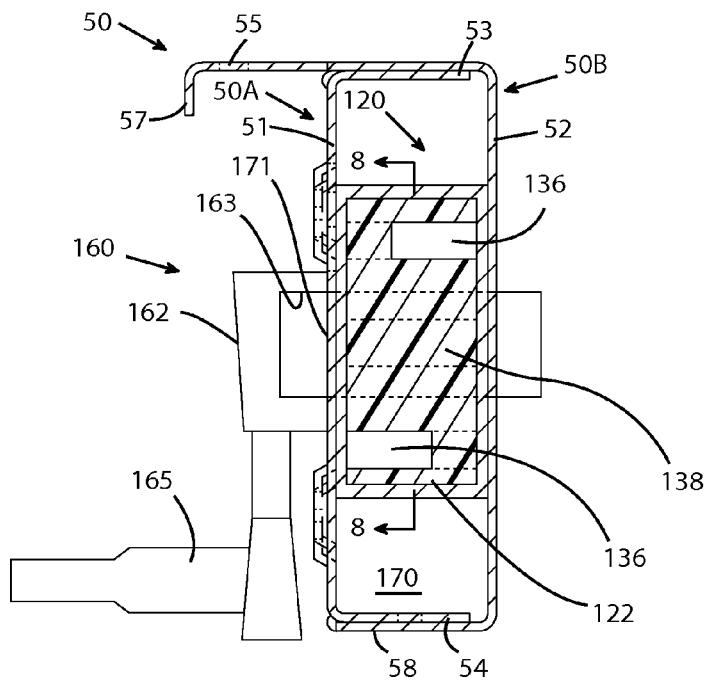
FIG. 6 is a partially sectioned view of an axle section of a trailer frame having a torsion disk suspension assembly mounted thereon.
Figures 7, 8:
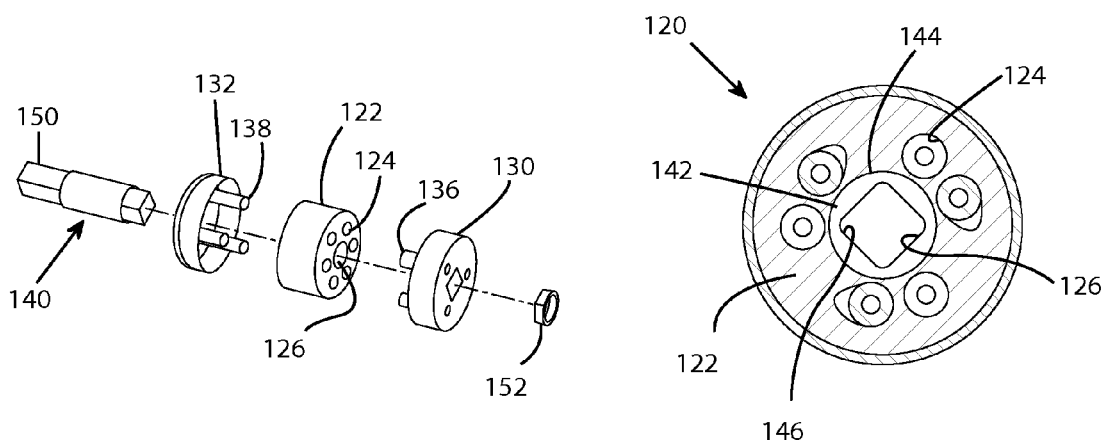
FIG. 7 is an exploded view of a torsion disk suspension assembly according to the invention.
FIG. 8 is a sectioned view of the torsion disk suspension assembly.

In the example shown, axle section 20 includes axle rails 50 on either side connected by one or more cross members. Axle section may be constructed in any known manner. According to another aspect of the invention, an enhanced axle section 20 is provided. Enhanced axle section 20 has axle rails 50 having a box-like cross section. This cross-section may be formed in a number of manners including by welding an inner sidewall to a c-shaped channel. Alternatively, as best seen in FIG. 6, each axle frame member 50 may be formed from a pair of frame halves 50A, 50B. First frame half 50A may have a c-shaped section with top and bottom walls 53, 54 extending inward from an outer sidewall 51. Outer sidewall 51 and top and bottom walls 53, 54 may be formed as a single unit, for example by stamping, or constructed by joining individual components together. The second frame half 50B is also c-shaped having an outer side wall 52 with an upper lip 55 that fits over top wall 53 and extends beyond inner side wall 51 to match the width of the front and rear section frame members that attach to axle section 20. A downward extending tab 57 may be formed on the end of lip 55 to form a channel like section and add strength to lip 55. Second frame half 50B also includes a lower lip 58 that extends outward to overlie bottom wall 54. The first and second halves 50A, 50B may be joined by welds at the seams between top wall 53 and lip 55 and bottom wall 54 and lower lip 58. Each frame member 50 defines a cavity that is open at either end. As discussed below, the cavity 170 may be used to house suspension components. An suspension opening 171 may be provided in one or more of side walls 51, 52 to facilitate mounting of suspension components.

The box-like construction of axle rail 50 makes it resistant to torsional forces and less prone to racking when compared to existing I-beam frames. In addition, the box-like construction may be used to house and incorporate suspension components. For example, a torsion disk suspension may be inserted at either end of the axle section 20. Alternatively, suitable suspension mounts 59 (FIG. 2) may be provided for traditionally sprung axles.

As discussed, a dimple assembly 30 may be used to join one or more frame sections to axle section 20. In the axle section 20 shown, dimples 32 forming dimple patterns 35 at one or more ends of axle section 20 are stamped into outer sidewall 51 of first frame half 50A before attaching second frame half 50B. The dimple assembly 30 is mated to corresponding dimples 32 on forward and rearward sections 22, 24. While attachment of these sections is shown on outer sidewall 51, it will be appreciated that attachment may occur at the interior side 52 as an alternative.

Forward section 22 and rearward section 24 may include rails 26, 28 that have any cross-section, and may have cross-sections that are different from each other depending on the application. In the example shown, the cross-section of the rails 26, 28 of the forward and rearward sections 22, 24 are the same. Rails 26, 28 include an upstanding side wall 62 having a top wall 64 extending laterally outward and a bottom wall 66 extending laterally inward from the upper and lower extremities of sidewall 62. This cross-section may be referred to as a Z-shaped section. A first flange 67 may extend downward from an outer extremity of top wall 64 and a second flange 68 may extend upward from an inner extremity of bottom wall 66. Flanges 67, 68 form channel like sections at respective upper and lower extremities of rails 26, 28 improving the strength and torsional rigidity of the forward and rearward sections 22, 24.

As in the axle section 20, dimples 32 may be formed on the side wall 62 of forward and rearward sections 22, 24. To set the camber between adjacent sections, the dimple pattern on each section may be offset relative to the dimple pattern 35 on axle section 20. In the example shown, the dimple pattern 35 on the axle section 20 is fixed and the orientation of the dimple pattern 35 on forward and rearward sections 22, 24 is varied to create camber. It will be appreciated that the dimple pattern 35 on axle section 20 may be varied as well. The dimples 32 may be formed in any known manner including stamping.

As discussed above, for some applications, it is desirable to create camber between adjacent sections. Positive or negative camber in this context is a deviation from horizontal or zero camber. When a load is placed on a trailer frame, the frame deflects under the load. To maintain the load in a level configuration, it may be necessary to impart camber to the front or rear section.

The present invention overcomes the failings in the art by pre-setting the camber between adjacent sections through the dimples 32. A desired camber angle $\alpha$ in many applications has an absolute value of 0 to about 2 degrees, or in other words between about −2 degrees and about +2 degrees of camber. This range is not limiting, however, as greater amounts of camber may be set using a dimple pattern 35 according to the invention.

In the example shown, positive camber is created at the rearward section 24 relative to axle section 20 by shifting the dimples 32 on rearward section 24 downward relative to the position of the dimples 32 on axle section 20. As shown in FIG. 3A, the dimple pattern 35 on rearward section 24 defines a dimple axis 34' having a downward angle such that when the dimples 32 of rearward section 24 are aligned with dimples 32 on axle section 20, the rearward section 24 is angled upward relative to axle section 20 (FIG. 3). In the example shown, the dimple pattern 35 on axle section 20 is fixed or constant and the dimple pattern 35 on the forward or rearward sections 22, 24 is offset to create the desired camber. In this way a single axle section 20 may be mass produced and camber specifications met by stamping the dimple pattern into the forward or rearward sections 22, 24. It will be appreciated, however, that camber may be created by offsetting the dimple pattern 35 on axle section relative to one or both of the forward and rearward sections 22, 24 or by applying an offset to dimple patterns 35 on both the axle section 20 and forward or rearward sections 22, 24. Any angle may be achieved in this manner.

The camber angle over the length of the section causes the end of the section to be at a different height than the adjacent section. Often, customers will specify a desired change in height rather than a specific camber angle. The specified change in height may be used to calculate the camber needed at the dimples 32. In the example shown, a camber of about 1 degree may be used to achieve a one inch increase in the height of the rearward section 24 at its outer end.

Figure 5:
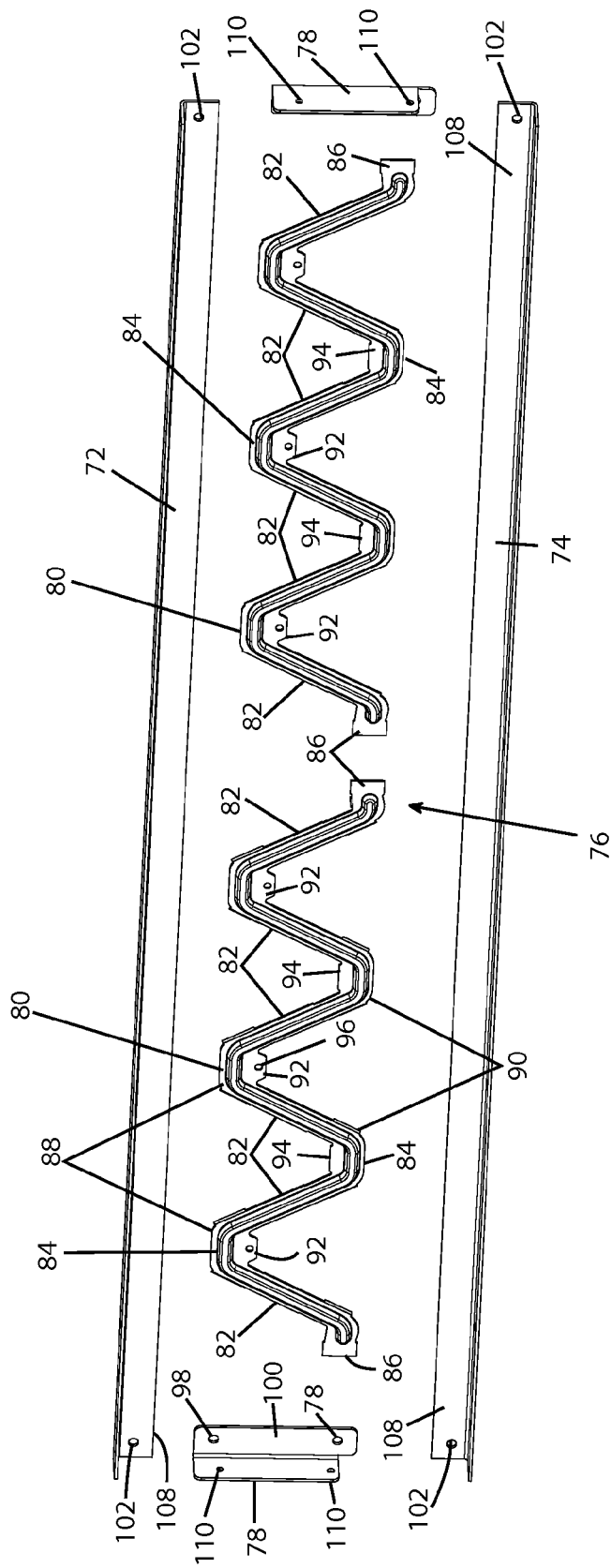
FIG. 5 is an exploded view showing details of a cross member in a trailer according to the invention.

According to another aspect of the invention, trailer frame 10 includes cross frame members 14 that have a truss-like form. In particular, cross frame member 14 includes a top cross member 72 a bottom cross member 74 and a web section 76. Cross member 14 may further include end members 78 that extend between the top and bottom cross members 72, 74 at their outer extremities. As best shown in FIG. 5, top and bottom cross members 72, 74 may be formed from angle iron. Angle iron may be extruded or otherwise formed to any length needed for a given trailer application. The web section 76 may be constructed of individual members that connect the top cross member 72 and bottom cross member 74, or, as shown, be constructed from one or more, pre-formed patterned members 80. Using plural patterned members 80 allows any length cross member 72 to be created without the need for a large die to create the web 76 and with less labor than assembling a web with individual trusses.

In the depicted example, each patterned members 80 include plural trusses 82 that extend at an angle relative to cross members 72, 74. Trusses 82 may be joined at the upper and lower extremities by a land 84 to form a wave-form shaped patterned member 80. To facilitate connection of patterned members 80 to each other and to ends 78, tabs 86 may be provided at the lateral extremities of patterned members 80. Top tabs 88 may be provided at the upper extremity of the patterned member to facilitate attachment of web section to top cross member(s) 72. Bottom tabs 90 may be provided to facilitate attachment of web section 76 to bottom cross member 74. Upper and lower peak tabs 92, 94 may be provided to span the interior portion where trusses 82 come together. As shown, one or more of tabs 92 may be provided with openings 96 for fasteners. As shown, the patterned member 80 may be formed as a single unit, as by stamping or in a mold. To accommodate different lengths, multiple patterned members 80 may be used within a given cross frame member 14. As shown, a pair of patterned members 80 may be joined to each other to form a web 76.

Attachment of the web 76 to top cross member 72 and bottom cross member 74 may be accomplished in any known manner including fasteners or welds. In the example shown, welds are applied at each land 84 to join top cross member 72, bottom cross member 74, and web 76. Ends 78 may, likewise, be attached in any known manner. In the example shown, fasteners (not shown) extend through openings 98 formed on an inward extending tab portion 100 of end 78, and corresponding end openings 102 formed on a downward extending leg 104 of top cross member 72 and an upward extending leg 108 of bottom cross member 74. Side openings 110 may be provided on ends 78 to attach cross frame member 14 to side frame members in trailer frame 10 with fasteners.

In accordance with another aspect of the invention, trailer frame 10 may include a torsion disk suspension 120. Torsion disk suspension 120 generally includes a suspension cartridge 121 that is inserted within the cavity 170 defined by a longitudinal frame member 50 in axle section 20. During assembly, the suspension cartridge 121 is inserted at either end of frame member 50 and aligned with a suspension receiver 58. A suspension mount may pass through receiver 58 and through suspension cartridge 121 to support it within frame member 50.

According to one embodiment, suspension cartridge 121 includes an elastomeric element 122 with plural pin receiving bores 124 arranged around a central axle bore 126. It will be appreciated that elastomeric element 122 does not need to have a circular disk shape and therefore reference to a disk suspension should not be limiting terms of the shape of the elastomeric element, which may have any shape capable of providing elastomeric material surrounding plural pin receiving bores.

Suspension 120 may further include an outer cap 130 and an inner cap 132, which may be received in respective openings defined in the outer sidewall 51 and inner sidewall 52 of axle rail 50. The caps 130, 132 enclose elastomeric element 122. Outer cap 130 has one or more outer pins 136 extending inward therefrom, and inner cap 132 has inner pins 138 extending inward therefrom. Pins 136, 138 are received in respective pin receiving bores 124. As best shown in FIG. 6, pins 136, 138 extend inwardly an extent sufficient to overlap one another. In the example shown each cap 130, 132 is provided with three pins 136, 138. The pins 136 and 138 are spaced about a pin circle to form an alternating arrangement of outer pins 136 and inner pins 138 about the elastomeric element 122.

An axle mounting assembly 140 may be received in axle bore 126 and includes a journal 142 having a cylindrical outer surface 144 and a square bore 146. Outer end cap 130 and inner end cap 132 have corresponding square bores through which a square sectioned axle mount 150 is received. A portion of axle mount 150 extends outwardly from outer sidewall 51 and may be secured by a castle nut 152. An axle assembly 160 is supported on axle mount 150. Axle assembly may include an axle arm 162 that has a corresponding axle mount receiver 163 that conforms to axle mount such that torque created at axle 165 is transmitted to the elastomeric element through axle mount 150. Axle arm 162 extends downward and rearward from torsion suspension 120 such that any vertical movement of the axle 165 creates a torsional moment at the suspension 120. In particular, vertical movement of axle 165 causes outer end cap 130 to rotate, which in turn causes outer pins 136 to rotate within elastomeric element 122. Compression of the elastomeric element between pins 136 and 138 absorbs shock and creates a return moment that urges the axle 165 toward the road surface.

With reference to FIGS. 9-12 an alternative trailer frame 210 is shown. Trailer frame 210 includes an axle section 220. A forward section 224 may be attached to axle section 220 in the same manner as the rearward section 224 shown or another form of attachment may be used. In the example shown, the joint assembly for the forward section and the rearward section is the same and will be discussed in connection with the rearward section 224 being attached to the axle section 220. In accordance with another embodiment of the invention, maximizing the spacing between dimples has been found to improve the load carrying capacity and strength of the joint. In particular, a correlation between the spacing of the dimples and the strength of the joint was found. As a result, strength is maximized by placing the dimples as far from each other as the confines of the frame section will allow. While the following description discusses a dimple pattern having plural dimples, it will be appreciated that a single dimple may be used. To achieve the spacing discussed, the single dimple may be a ring-like shape with the dimple being formed at the periphery of the joint in a continuous form.

With reference to FIG. 11, a dimple assembly 230 having plural dimples forming a dimple pattern 235 is shown. In particular, a dimple pattern 235 comprised of four dimples 232 is shown. The dimples 232 form two rows and two columns with each dimple being equally spaced vertically and horizontally from each other. In the vertical direction, the spacing of dimples 232 is limited by the height of the frame sections 220, 224 being joined. To maximize the vertically spacing, dimples 232 are located near the upper and lower extremities of the frame sections 220, 224. Horizontally, the spacing of dimples 232 may be maximized by placing the dimples at the outer extremities of the frame members forming the joint J. It will be appreciated, however, that the joint formed between the adjacent sections 220, 224 may not span the entire length of one or both sections. For example, as shown, intervening structures such as mounts for axles and other structures may limit the amount of overlap between adjacent sections 220, 224 in this sense, the strength of the joint is maximized by placing the dimples as close to the edges of the overlapping joint. In a general sense, the spacing of dimples 232 is maximized by placing them near the extremities (upper, lower, inner or outer) of the joint. As best seen in FIG. 11, the joint J is defined by the overlap between the ends of axle section 220 (trailing edge T) and rearward section 224 (leading edge L). It will be appreciated that similar overlap may occur at a forward section, if used. In the vertical direction, the overlapping encompasses the entire height of each sidewall 262 of frame sections 220,224, such that the upper and lower extremities of joint J coincide with the upper and lower extremities of sidewalls 262. Horizontally, the spacing of dimples is maximized by placing the dimples near the inner and outer extremity of joint J i.e. near the trailing edge T of a first frame member (axle section 220) and the leading edge L of a second frame member (rearward section 224). It will be understood, that the spacing between dimples will vary depending on the size of the frame members with smaller frame members bringing the dimples closer to each other than on a larger frame member. In addition, the spacing may be varied to accommodate other frame components (cross members, outriggers, tank hangers, suspension components etc.) that may be in the way. In addition, the spacing may be varied based on load. For example, a large frame may carry a reduced load allowing for a smaller spacing between dimples. In the example shown, the spacing is maximized for the trailer frame size with spacing from the extremities of the joint J provided to accommodate surrounding structures including the Huck® fasteners and suspension mounting brackets. In the vertical direction, the spacing of the center of the dimples is the frame member (rail) height minus 2.75 inches. For example, 6 inch rail has 3.25 inch vertical spacing; 7.5 inch rail has 4.75 inch vertical spacing; 9 inch rail has 6.25 inch vertical spacing etc. It will be appreciated that a larger spacing may be achieved when less clearance is required for the fasteners, for example, when rails are welded together. Horizontally the spacing for a 6 inch rail is about 3 to 5 inches. Measuring from the end of the frame member, for the four dimple pattern shown, the first column of dimples is located 4 inches from the edge and the second column is 8 inches from the edge for a 6 inch frame member; 7 inches from the edge and 10 inch from the edge for a 7.5 inch frame member; and 7 inches from the edge and 10 inches from the edge for a 9 inch frame member. Considering the spacing between the dimple centers, the 6 inch 7.5 inch and 9 inch frame members include a vertical spacing V of the dimples ranging from about 2.75 inches to 4.75 inches and the horizontal spacing H between the dimples ranging from about 3 inches to about 4 inches. It will be appreciated that these ranges are not limiting. In a low load scenario, the dimples may be placed next to each other i.e. 0 spacing in both vertical and horizontal directions, and the upper limit of the spacing is only limited by the frame rail size. Consequently, to achieve larger vertical spacing, a larger frame member would be used.

As discussed, the example shown has equal vertical spacing between all of the dimples and equal horizontal spacing between all of the dimples forming a regular rectangular pattern. It will be appreciated that the spacing between the dimples and pattern may be unequal or varied across the pattern as discussed in the earlier embodiment.

Dimple pattern 235 on adjacent sections may be used to create camber between adjacent sections 220 and 224 in the same manner as discussed in the previous embodiment. In particular, the axes defined by dimple pattern 235 on axle section 220 and the dimple pattern 235 on rear section 224 may be offset relative to each other by an angle to create the desired camber between the sections 220, 224. The offset may be created by offsetting one of the dimple patterns by the desired angle or by offsetting each of the dimple patterns a portion of the desired angle such that when the dimples are nested within each other the cumulative offset produces the desired camber angle.

Moreover, as discussed in the previous embodiment, rearward section 224 may include rails 226, 228 that have an cross section including cross sections that are different from the other sections from trailer frame 210 including axle frame 220. Or, as shown, axle section 220 and rearward section 224 may have the same cross section as best seen in FIG. 12, each section 220, 224 has an upstanding sidewall 262 a top wall 264 extending laterally outward from sidewall 262 and a bottom wall 266 extending laterally inward from sidewall 262. This cross section may be referred to as a Z-shaped section. A first flange 267 may extend downward from an outer extremity of top wall 264 and a second flange 268 may extend upward from an inner extremity of bottom wall 266. Flanges 267, 268 form channel-like sections at respective upper and lower extremities of rails 226, 228 improving the strength and torsional rigidity of the strength and torsional rigidity of the rearward section 224 and axle section 220. To set the camber between sections 220 and 224, the dimple pattern 235 on rearward section 224 may be offset relative to the dimple pattern 235 on axle section 220. In the example shown, the dimple pattern 235 on axle section 220 has a horizontal major axis that bisects the rows of dimples 232. The dimple pattern formed on the sidewall 262 on rearward section 224 is offset such that the major axis of dimple pattern 235 on rearward section 224 extends at an angle relative to horizontal. As discussed in the previous embodiment, the amount of offset may be used to create any desired camber angle having an absolute value of 0° to 90°. Although large camber angles are possible, typical camber angles used have an absolute value of about 0° to about 2°, or in other words, between −2° and about +2° of camber. This range is not limiting, however, as greater amounts of camber may be set by using a dimple pattern 235 according to the invention.

In the example shown, a positive camber is created at rearward section 224 relative to axle section 220 by shifting the dimples 232 on rearward section 224 downward relative to the position of dimples 232 on axle section 220. As in the previous embodiment, dimple pattern 235 on axle section 220 is fixed or constant and the dimple pattern 235 on adjacent sections, such as, rear ward section 224 is offset to create the desired camber. In this way, a single axle section 220 may be mass produced and camber specifications met by varying the dimple pattern into forward or rearward sections attached to axle section 220. It would be appreciated, however, that camber may be created by offsetting the dimple pattern 235 on axle section relative to one or both of the forward or rearward sections or by applying an offset to the dimple pattern 235 on both the axle section 220 and the forward or rearward sections attached thereto. Any angle maybe achieved in this manner.

To attach adjacent sections together, a fastener including but not limited to a weld, adhesive or mechanical fastener may be used. In the example shown, a mechanical fastener is used to clamp adjacent frame members together at dimples 232. To that end, dimples 232 may include a central opening 242 through which a fastener 244, such as a Huck® bolt or the like, is received. Dimples 232 may have any shape including geometric shapes, oblong, or irregular shapes. The circular shape shown is just one example. As shown, dimples 232 may have an outwardly opening frusto-conical cross section and may be stamped into the sidewall 262 of a frame section, such that a base 240 of dimple 232 is located inward of sidewall 262. Dimples 232 may be formed by other known machining processes as well. A dimple wall 246 extends axially outward from base 242 of dimple 232. The dimple size may vary depending on the surface to which the dimple is applied, the area of the joint, and the number of dimples used. Also, the dimple size may depend somewhat on the loading of the dimple. Therefore, the dimples 232 shown are not limiting.

Figure 9:
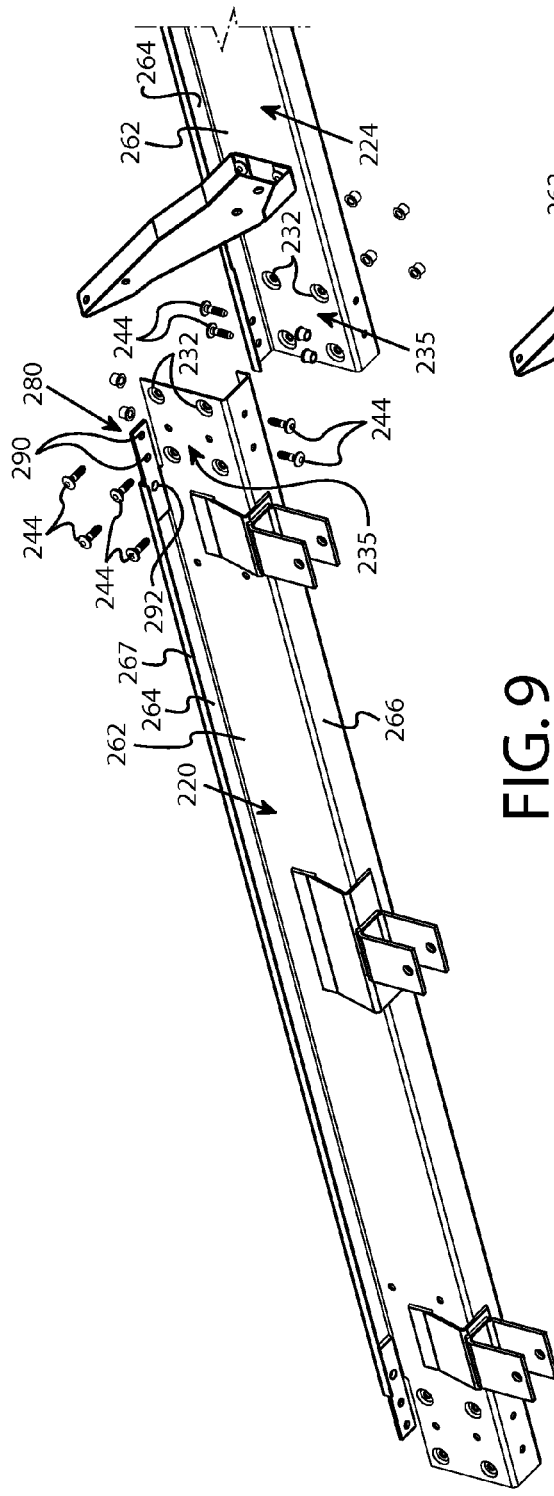
FIG. 9 is a bottom perspective view of a trailer frame according to the invention partially exploded to show details of an alternative joint between the adjacent sections of the trailer frame.

According to another aspect of the invention, a reinforcement assembly 280 may be provided at one or more of the top wall 264 or bottom wall 266. In the examples shown, reinforcement assembly 280 is provided on top wall 264 at the joint J between adjacent frame sections. In particular, reinforcement assembly 280 is provided where the top wall 264 of axle section 220 and rearward section 224 meet. As best seen in FIG. 9, top wall 264 of axle section 220 terminates at the joint area such that the joint area of axle section 220 does not have an outward extending wall at its upper extremity along the portion corresponding to the overlap between axle section 220 and rearward section 224. As best seen in FIG. 11, top wall 264 terminates at a point on axle section 220 corresponding to where the leading edge L of rearward section 224 overlaps axle section 220. With reference to FIG. 12, the top wall 264 of rearward section 224 extends over sidewall 262 of axle section 220 in the joint area. The reinforcement assembly 280 includes a plate 282 sized to fit within the space between flange 267 and sidewall 262 beneath top wall 264 of each section. As shown, a first portion 284 of plate 282 lies beneath top wall 264 of axle section 220 and a second portion 286 lies beneath a portion of top wall 264 of rearward section 224. Each portion 284, 286 may be attached to the respective top walls 264 of axle section 220 and rearward section 224. Attachment may be made by any fastener including but not limited to mechanical fasteners, welds, or adhesives. For example, plate 282 is provided with plural receivers 290 through which mechanical fasteners, such as, Huck® bolts are inserted to clamp the top wall 264 one or more of the frame sections 220,224 to plate 282. As shown, combinations of multiple fastener types may be used to facilitate assembly. For example, as shown in FIG. 9, plate 282 may be tack welded to axle section 220 at 292 and a pair of receivers 290 are provided in a second portion 286 of plate 282. Huck® bolts extend through top wall 264 of rearward section 224 to attach it to second section 286 of plate 282.

Figure 10:
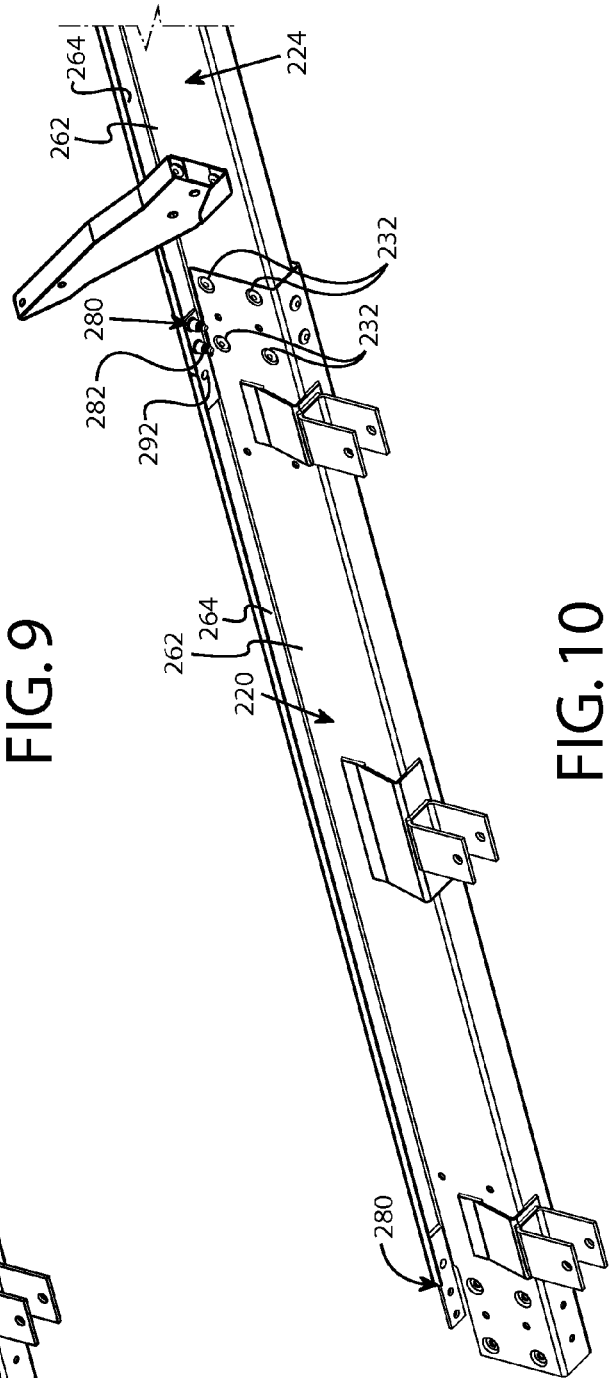
FIG. 10 is a bottom perspective view of the alternative trailer frame with the adjacent sections attached to each other.

Plate 282 may have any thickness depending upon the amount of reinforcement required. As best seen in FIG. 12, the thickness of plate 282 may be greater than the thickness of top wall 264. For example, the thickness of plate 282 may be at least twice the thickness of top wall 264. With reference to FIGS. 9 and 10, as shown, the same reinforcement assembly 280 may be provided at the opposite end of axle section 220 for use in connection with a forward section of the trailer 210 as discussed in the previous embodiment. In the example shown, the reinforcement assembly 280 is fixed to the axle section 220 such that the use of fasteners is only on the adjacent sections, such as, reward section 224. It will be appreciated however, that the reverse arrangement may be used or the reinforcement assembly 280 may be attached separately with mechanical fasteners extending through each portion 284, 286.

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Embodiments herein can be constructed of various materials. One or more portions of a trailer frame can be made of (but are not limited to) different types of plastic, metal, ceramic, rubber, glass, carbon, fiber reinforced or other composites, and other suitable materials. Where necessary or desirable (e.g., with rotating or folding embodiments), known structures such as rails, hinges, springs, and others can be employed with aspects herein without departing from the scope or spirit of the innovation.

Specific embodiments of an innovation are disclosed herein. One of ordinary skill in the art will readily recognize that the innovation may have other applications in other environments. In fact, many embodiments and implementations are possible. The following claims are in no way intended to limit the scope of the subject innovation to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A trailer frame comprising:
   an axle section having at least one frame member having a first end and a second end;
   a rearward section having at least one frame member having a first end and a second end, wherein the rearward section is attachable to the axle section;

and a dimple assembly joining the axle section to the rearward section, the dimple assembly including a dimple pattern formed on the at least one frame member of the axle assembly, the first dimple pattern on the axle assembly defining a first dimple axis, and a second dimple pattern formed on one end of the at least one frame member of the rearward section and nestable within the first dimple pattern formed on the axle section, the second dimple pattern on the rearward section defining a second dimple axis offset relative to the first dimple axis to create a camber between the axle section and the rearward section when the first dimple pattern is nested within the second dimple pattern;

wherein each of the frame members of the axle section and the rearward section carrying the respective first and second dimple patterns include an upstanding sidewall and wherein the sidewall of the axle section and the sidewall of the rearward section overlap at a joint, wherein the dimple pattern on the axle section is formed on the sidewall of the rearward section and the dimple pattern on the rearward section is formed on the sidewall of the rearward section;

wherein the first dimple pattern of the axle section and the second dimple pattern of the rearward section each include plural dimples and wherein the dimples are located near an outer extremity of the joint.

2. The trailer frame of claim 1, wherein each dimple has a circular base, the base defining a central opening adapted to receive a fastener that secures the first dimple pattern to the second dimple pattern.

3. The trailer frame of claim 1, wherein the camber between the axle section and the rear section has an absolute value from 0° to about 2°.

4. The trailer frame of claim 1, wherein the axle section and the rearward section include a pair of laterally spaced longitudinal frame members, wherein the dimple pattern of the axle section is formed in each of the longitudinal frame members of the axle section and the dimple pattern of the rearward section is formed in each of the longitudinal frame members of the rearward section.

5. The trailer frame of claim 1, wherein the plural dimples are spaced vertically by an amount equal to a height of the sidewall minus 2.75 inches.

6. The trailer frame of claim 1, wherein a vertical spacing between the plural dimples in each said dimple pattern ranges from about 2.75 inches to about 4.75 inches.

7. The trailer frame of claim 1, wherein a horizontal spacing between the plural dimples in each said dimple pattern ranges from about 3 inches to about 5 inches.

8. The trailer frame of claim 1, wherein each of said first dimple pattern and said second dimple pattern includes four dimples arranged in two columns and two rows.

9. The trailer frame of claim 8, wherein the four dimples define a rectangular dimple pattern.

10. The trailer frame of claim 1, wherein each dimple pattern includes the plural dimples having a circular base and conical wall extending inward from the sidewall on the respective frame members on the axle section and the rearward section.

11. The trailer frame of claim 10, wherein the base of each said dimple defines an opening adapted to receive a fastener, wherein when the dimple patterns are nested together, the openings of each said dimple on the axle section align with a respective one of the openings on the rear section.

12. The trailer frame of claim 1 further comprising a reinforcement assembly supported on the axle section opposite the rearward section, wherein a portion of the reinforcement assembly overlies and attaches to a portion of the rearward section, when the rearward section is attached to the axle section.

13. The trailer frame of claim 12, wherein the reinforcement assembly includes a plate.

14. The trailer frame of claim 12, wherein the axle section includes the sidewall and a top wall extending laterally outward from the sidewall, wherein the top wall terminates at a joint portion of the axle section; and wherein the rearward section includes the sidewall and a top wall extending laterally outward from the sidewall, wherein upon attachment of the axle section to the rearward section, the top wall of the rearward section extends over the sidewall of the axle section and lies adjacent to the top wall of the axle section at an edge of the joint; and wherein the reinforcement assembly includes a reinforcing member attached to the top wall of each of the axle section and the rearward section at the joint.

15. The trailer frame of claim 14, wherein the reinforcing member is tack welded to the top wall of the axle section.

16. The trailer frame of claim 14, wherein the reinforcing member includes a first portion and a second portion, where the first portion lies adjacent to the top wall of the axle section and is fastened to the axle section by a first fastener, and wherein the second portion lies adjacent to the top wall of the rearward portion, wherein the second portion is attached to the top wall of the rearward portion by a second fastener.

17. The trailer frame of claim 16, wherein the first fastener is a tack weld and the second fastener is a Huck® bolt.

* * * * *